United States Patent
Klein et al.

[19]

[11] Patent Number: 6,157,932
[45] Date of Patent: Dec. 5, 2000

[54] METHOD OF UPDATING A REDUNDANT SERVICE SYSTEM WHILE PRESERVING TRANSACTION DATA IN A DATABASE FEATURING ON-LINE RESYNCHRONIZATION

[75] Inventors: Stieg R. Klein; Michael R. Baker, both of San Jose, Calif.

[73] Assignee: Aspect Telecommunications, San Jose, Calif.

[21] Appl. No.: 09/090,857

[22] Filed: Jun. 4, 1998

[51] Int. Cl.[7] .................................................. G06F 17/30
[52] U.S. Cl. .................... 707/204; 707/200; 707/202; 707/203; 709/248; 709/221
[58] Field of Search ............................. 707/200, 202–204; 709/248, 221

[56] References Cited

U.S. PATENT DOCUMENTS 5,155,837  10/1992  Liu et al. ................................ 709/221
5,469,503  11/1995  Butensky et al. ....................... 379/265
5,996,001  11/1999  Quarles et al. ......................... 709/203

*Primary Examiner*—Thomas G. Black
*Assistant Examiner*—William Trinh
*Attorney, Agent, or Firm*—Blakely, Sokoloff, Taylor & Zafman LLP

[57] ABSTRACT

A method and computer software product for updating a redundant transaction service system, wherein the redundant transaction service system includes a first transaction service device and a second transaction service device. The method comprises removing the first transaction service device from on-line service and installing new software on the first transaction service device. Next, a current database associated with the second transaction service device is transferred to the first transaction service device. The transferred current database is converted into a format associated with the new software. After the transfer and conversion of the current database, the first transaction service device is returned into on-line service.

26 Claims, 6 Drawing Sheets

METHOD OF UPDATING A REDUNDANT SERVICE SYSTEM WHILE PRESERVING TRANSACTION DATA IN A DATABASE FEATURING ON-LINE RESYNCHRONIZATION

FIELD OF THE INVENTION

The present invention relates to the field of transaction processing systems, such as automatic call distributors (ACDs). More specifically, the present invention relates to the updating of transaction processing systems operating in the context of a redundant service system.

BACKGROUND

Transaction processing systems (TPS), such as automatic call distributors (ACDs), are typically used in transaction service systems to provide automatic routing of telephone calls or other transactions to an appropriate or select destination. A significant requirement of an transaction service system is the need for a continuous and substantially real-time system operation and availability of access to data. Moreover, in certain transaction service systems, the system is configured to have extensive redundancy or backup systems in order to minimize any adverse impact relating to a failure of any component within the system.

In existing redundant transaction service systems, a primary TPS and a secondary TPS are used in conjunction with one another in order to provide the necessary redundant function between the two TPSs. The primary TPS has an associated primary database comprised of data received by the primary TPS during normal operation. The primary TPS is configured to supply the secondary TPS with the data received by the primary TPS during normal operation. As such, during normal operation, the secondary TPS maintains an up-to-date copy of the primary database on the secondary TPS's database. Accordingly, if the primary TPS suffers a failure, the secondary database associated with the secondary TPS contains an up-to-date redundant or duplicate copy of the data contained in the primary database prior to the failure of the primary TPS.

As mentioned, a significant requirement of mary transaction service systems is the need for a continuous and substantially real-time system operation and availability of access to data. Accordingly, when an on-line transaction service system is removed for service, such as for new software installations or upgrades, the cost associated with the off-line service time can, in some instances, be tremendous. For example, in the case of an transaction service system which is required to run 24 hours a day, seven days a week (7×24), an off-line service time of three hours may cost an operator of such an 7×24 transaction service system a substantial amount of money and lost sales. As such, the need for a reduced off-line service period is greatly increased especially in situations where the transaction service system is required to maintain extensive on-line times.

In existing techniques, redundant transaction service system have been serviced (e.g., software installation or upgrade) by first removing the secondary (backup) TPS from an on-line service status to an off-line service status, while maintaining the primary TPS in on-line service. Accordingly, once the secondary TPS is taken off-line, the secondary database contained in the secondary TPS becomes outdated with respect to the primary database associated with the primary TPS, as the primary TPS is maintained on-line and continues to acquire new transaction data. Next, the new software or software upgrade is installed in the secondary TPS which is then rebooted with the new software. Correspondingly, the secondary database (outdated database) maintained on the secondary TPS is then converted into a format compatible with the new software. The secondary database maintained on the secondary TPS, however, is still an outdated database with respect to the primary database maintained on the primary TPS.

Next, the primary TPS is removed from an on-line service to an off-line service status, thereby effectively removing the entire transaction service system from service, as both primary and secondary TPSs are now off-line. Correspondingly, the current database maintained on the primary TPS is backed up onto a tape or other storage medium. Subsequently, the new software or software upgrade is installed in the primary TPS which is then rebooted with the new software. The current or most recent transaction data maintained on the primary database is then converted into a format compatible with the newly installed software. At this particular point, both the primary TPS and the secondary TPS contain the new or upgraded software, however, only the primary database contains the current or most recent data in a format compatible with the new software.

Since only the primary TPS contains the current or most recent transaction data in a format compatible with the new software, a transfer between the primary TPS and secondary TPS is required in order to have up-to-date redundant databases within the transaction service system. Accordingly, a synchronization function is executed which transfers data (off-line) from the primary TPS database (current database) to the secondary TPS database (outdated database). After execution of the synchronization function, the respective databases maintained on both the primary and secondary TPSs now contain the same transaction data. After the completion of the data transfer, the transaction service system is brought back on-line, wherein the primary TPS receives information (call service) and supplies corresponding data to the secondary TPS, thereby maintaining a redundant transaction service system.

The aforementioned process, however, typically requires a system down time (system off-line) on the order of several hours, which in the case of a transaction service system that is required to run 24 hours a day, seven days a week (7×24), would result in substantial costs associated with a software installation or upgrade.

It is therefore desirable to provide a technique which would reduce the amount of off-line time necessary to perform a new software installation or upgrade, or other TPS servicing, with respect to a redundant transaction service system.

SUMMARY OF THE INVENTION

A method and computer software product for updating a redundant transaction service system, wherein the redundant transaction service system includes a first transaction service device and a second transaction service device. The method comprises removing the first transaction service device from on-line service and installing new software on the first transaction service device. Next, a current database associated with the second transaction service device is transferred to the first transaction service device. The transferred current database is converted into a format associated with the new software. After the transfer and conversion of the current database, the first transaction service device is returned into on-line service.

In one embodiment of the present invention, a simultaneous transfer and data format conversion is performed on the current database, wherein the current database is provided to the first transaction service device in a format compatible with the new software.

BRIEF DESCRIPTION OF THE DRAWINGS

The present invention is illustrated by way of example in the following drawings in which like references indicate similar elements. The following drawings disclose various embodiments of the present invention for purposes of illustration only and are not intended to limit the scope of the invention.

DETAILED DESCRIPTION

The following detailed description sets forth numerous specific details to provide a thorough understanding of the invention. However, those of ordinary skill in the art will appreciate that the invention may be practiced without these specific details. In other instances, well-known methods, procedures, protocols, components, algorithms, and circuits have not been described in detail so as not to obscure the invention.

Although particular embodiments of the invention are described herein as used in a call service system, it will be appreciated that the present invention may be used with any type of transaction processing system capable of handling various types of transactions. A particular transaction service system may be capable of handling any number of transactions, such as telephone calls, electronic mail messages, voice mail messages, facsimiles, video sessions, and network sessions.

Figure 1:
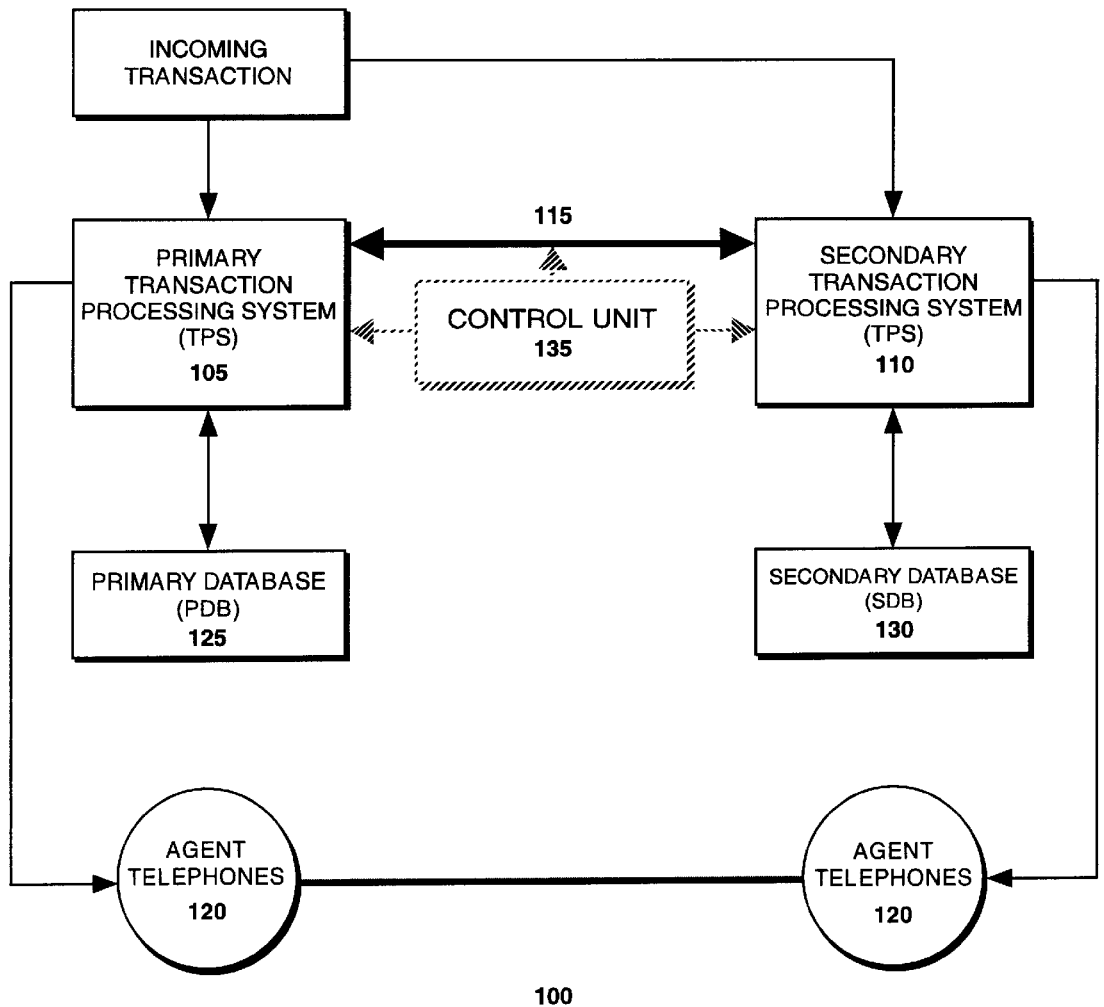
FIG. 1 illustrates a simplified block diagram of an embodiment of a redundant transaction service system capable of implementing the teachings of the present invention.

FIG. 1 is a simplified block diagram of an embodiment of a redundant transaction service system 100 capable of implementing the teachings of the present invention. FIG. 1 illustrates a redundant transaction service system 100 containing a primary transactional processing system (TPS) or automatic call distributor (ACD) 105, which is coupled to a secondary primary transactional processing system (TPS) or automatic call distributor (ACD) 110, via a system network connection infrastructure 115. The system network connection infrastructure 115 is configured to allow for the high-speed transfer of information or data between the primary TPS 105 and the secondary TPS 110, and vice versa. As illustrated, each TPS in the system 100 is configured to receive a series of transactions, inquires, or calls, which are routed to the appropriate destination, such as service agent telephones 120, based upon the routing protocol associated with each TPS.

The primary TPS 105 maintains a database 125 (primary database 125) which contains transaction data corresponding to transactions, such as incoming inquiries or calls, which are received by the transaction service system 100. Likewise, the secondary TPS 110 maintains a database 130 (secondary database 130) which contains data corresponding to transactions, such as incoming inquiries, which are received by the transaction service system 100. The transaction data may comprise a variety of information, such as the subject of present or past calls, call history associated with a particular call or caller, or any other transaction information or data.

In one embodiment, the primary TPS 105 is configured to be an "active" transaction or call receiving center, wherein the primary TPS 105 is configured to receive all incoming transactions. Correspondingly, when the primary TPS 105 is configured to be the "active" transaction receiving center, the secondary TPS 110 is configured to be a "backup" transaction or call receiving center, wherein the secondary TPS 110 receives transaction data from the primary TPS 105 during normal operation, so that the secondary database 130 associated with the secondary TPS 110 continuously maintains a copy of the most current transaction data maintained in the primary database 125. In another embodiment, the secondary TPS 110 is configured to be the "active" transaction or call receiving center which receives all incoming transactions, such as calls, wherein the primary TPS 105 is configured to receive transaction data from the secondary TPS 110 during normal operation, so that the primary database 125 associated with the primary TPS 105 continuously maintains a copy of the most current transaction data received by the secondary database 130.

The transaction service system 100 as whole, along with the primary TPS 105 and secondary TPS 110, operate in accordance with one or more operating software applications. The operating software applications assists in the efficient routing and servicing of calls, by the primary TPS 105 and the secondary TPS 110, as they are received by the TPS system 100. The operating software application is maintained on each respective TPS, wherein the operating software is configured to assist in control of the transfer of information between the primary TPS 105 and the secondary TPS 110, and vice versa. In an alternate embodiment, an optional control unit 135 is configured to implement the operating software application for use in the transaction service system 100, wherein the control unit 135 is further configured to assist in control of the transfer of information between the primary TPS 105 and the secondary TPS 110, and vice versa.

Figure 2A:
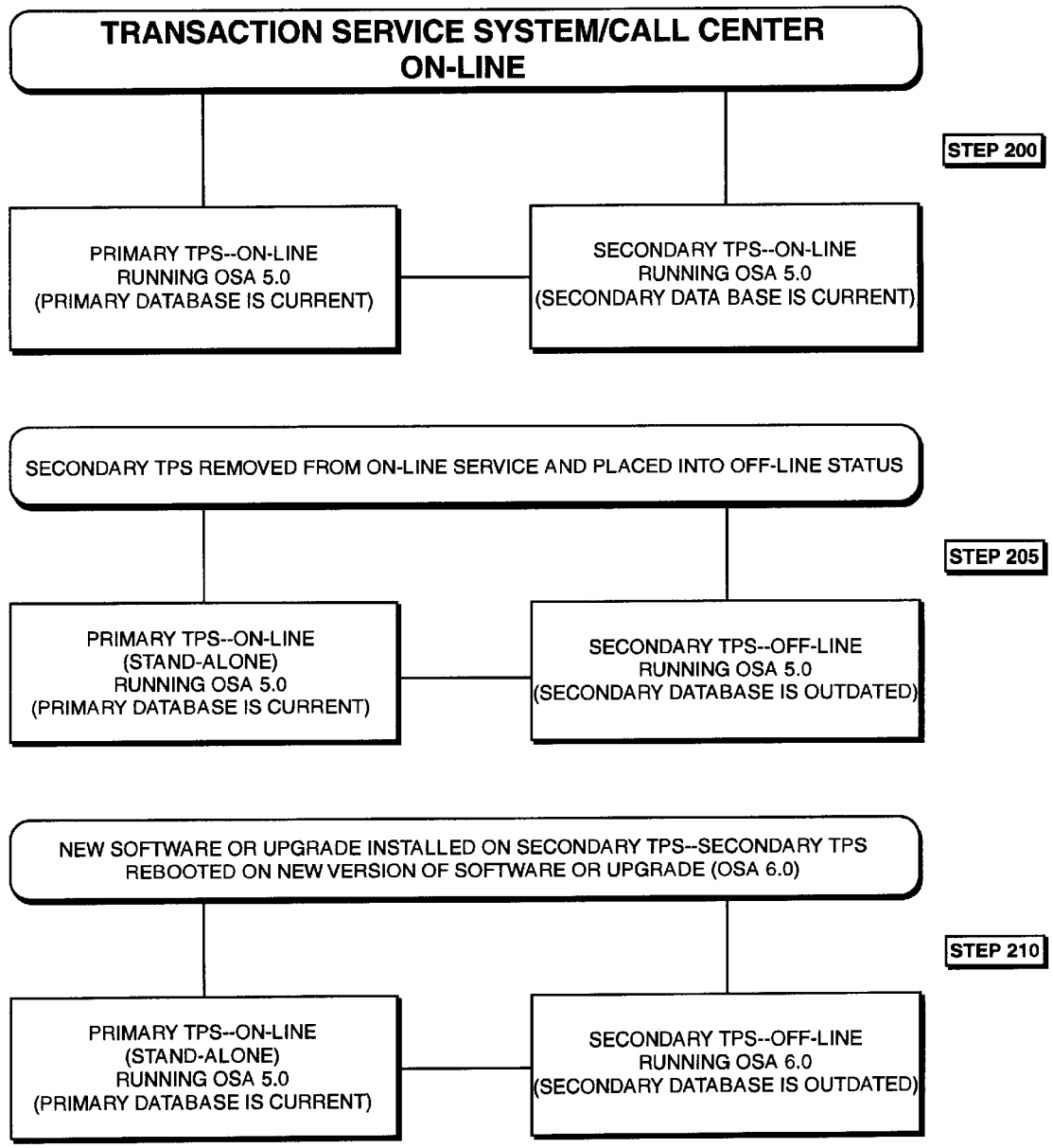
FIGS. 2a–2c illustrate a functional flow diagram illustrating an embodiment of a method for installing or upgrading an operating software associated with an redundant transaction service system.
Figure 2B:
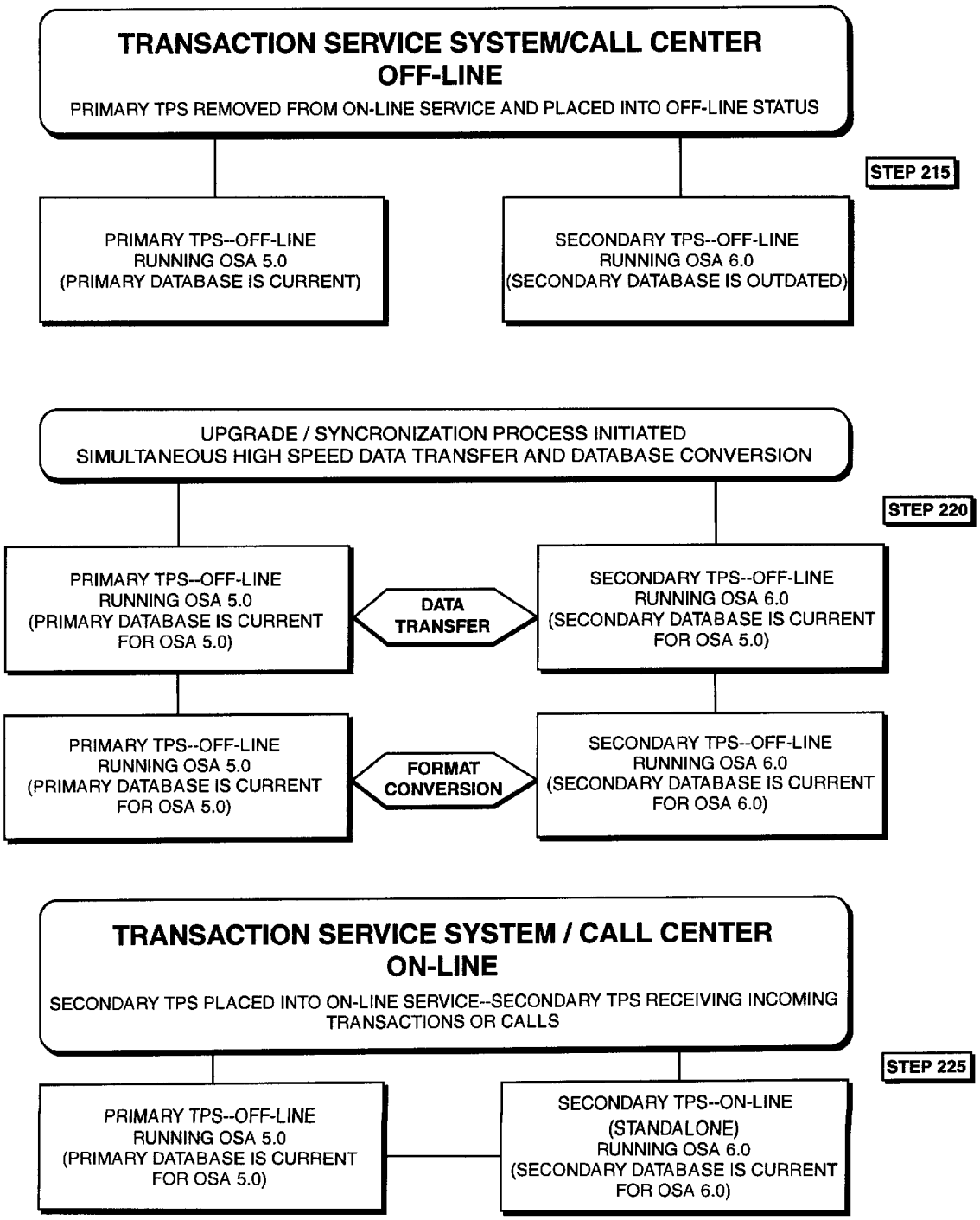
Figure 2C:
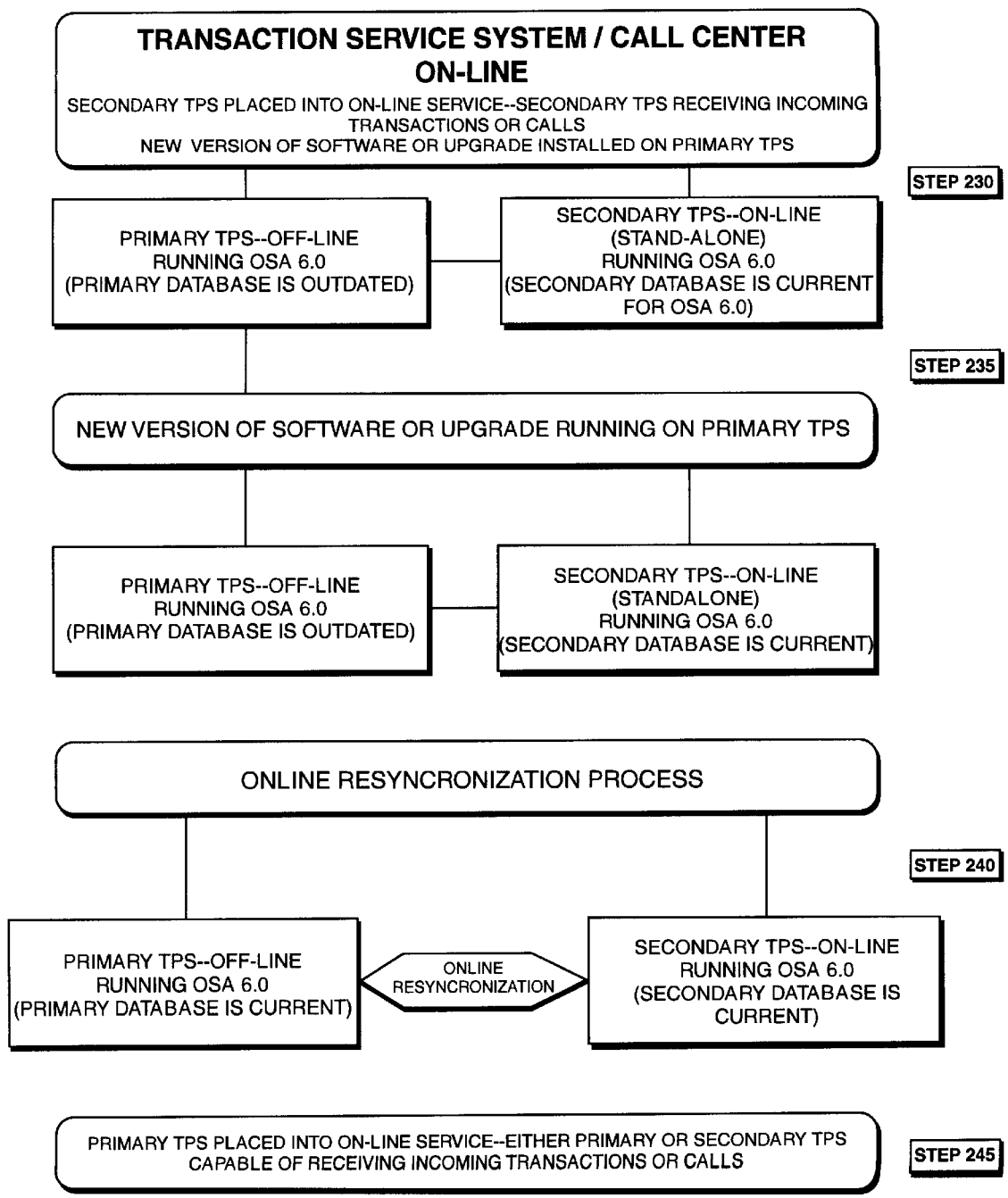

FIGS. 2a–2c illustrate a functional flow diagram illustrating an embodiment of a method for installing or upgrading the operating software associated with an transaction service system or call center 100.

At step 200, which corresponds to the normal operation of the transaction service system 100 prior to instituting a new software installation or upgrade, the transaction service system 100 is operating in on-line status. The on-line status indicates that at least one or more TPSs are actively receiving transactions (such as telephone calls). During the on-line status of Step 200, the primary TPS 105 is operating in accordance with an operating software application, illustrated as Operating Software Application version 5.0 (OSA 5.0). Likewise, the secondary TPS 110 is also operating in accordance with the operating software application, illustrated as Operating Software Application version 5.0 (OSA 5.0). The primary database 125, which is associated with the primary TPS 105 contains current transaction data corresponding to incoming transactions. Additionally, the secondary database 130, associated with the secondary TPS 110, likewise contains current transaction data, supplied from the primary database 125 of the primary TPS 105, corresponding to incoming transactions. Accordingly, both the primary TPS 105 and the secondary TPS 110 are in on-line service, wherein the primary TPS 105 is active and receives all incoming transactions and the secondary TPS 110 receives transaction data from the primary TPS 125 during normal operation.

At step 205, the secondary TPS 110 is removed from on-line service and is placed into an off-line status. When the secondary TPS 110 is placed into off-line status, the secondary TPS 110 is no longer receiving transaction data from the primary TPS 105. As such, based upon the fact that the secondary TPS 110 is no longer receiving transaction data from the primary TPS 105, the secondary database 130 becomes outdated due to the fact that the primary TPS 105 continues to service incoming transactions and accumulate new transaction data which is stored in the primary database 125. As such, the secondary database 130 becomes outdated with respect to the primary database 125. As indicated the primary TPS 105 continues to receive and service incoming transactions, as a standalone TPS, after the secondary TPS 110 has been placed into off-line status.

At step 210, a new software installation or upgrade, illustrated as Operating Software Application version 6.0 (OSA 6.0), is implemented or installed on the secondary TPS 110. Correspondingly, the secondary TPS 110 is rebooted on the new software version or upgrade (OSA 6.0), wherein the secondary TPS 110 is now operating in accordance with OSA 6.0, while maintaining the outdated secondary database 130 from Step 205. In an alternate embodiment, the secondary database is discarded prior to, or subsequently after, the new software installation or upgrade.

Correspondingly, the primary TPS 105 is still maintained in on-line service and continues to receive and service incoming transactions, thereby accumulating new transaction data, during the new software installation or upgrade being performed on the secondary TPS 110.

At step 215, the primary TPS 105 is removed from on-line service and is placed into an off-line status. Accordingly, when the primary TPS 105 is placed into off-line status, the primary TPS 105 is no longer receiving or servicing incoming transactions, and as such ceases to accumulate new transaction data. At this point the redundant transaction service system 100 is in an off-line service state, wherein neither the primary TPS 105 or the secondary TPS 110 are receiving/servicing incoming transactions or accumulating any new transaction data. During this off-line service status, the primary database 125 contains the latest or most recent transaction data prior to placing the transaction service system 100 into the off-line service state status.

At step 220, an upgrade/synchronization process is initiated wherein a high-speed data transfer and data format conversion are executed simultaneously with respect to the transaction data contained in primary database 125. During the high-speed data transfer, the transaction data contained in primary database 125, which includes the most recent transaction data, is transferred to the secondary TPS 110 via the system network connection infrastructure 115. The high speed transfer operates in accordance with the system network connection infrastructure protocol. Simultaneously, along with the high-speed transfer, the transaction data contained in primary database 125 is converted from the original OSA 5.0 format into a format compatible with the new software or upgrade operating on the secondary TPS 110, which in the present example is OSA 6.0.

The secondary TPS 110 then stores the newly transferred and formatted transaction data, which is in OSA 6.0 format, into the secondary database 130. Accordingly, the transferred transaction data (OSA 6.0 format) contained in the secondary database 130 is accessible, without the need for subsequent format conversion, by the secondary TPS 110 which operates in accordance with OSA 6.0. Correspondingly, the outdated transaction data maintained on the secondary database 130, prior to transfer and conversion, is either overwritten, disposed of, or otherwise discarded. The secondary database 130 associated with the secondary TPS 110 now contains the most recent transaction data, in the OSA 6.0 format, prior to placing the transaction service system 100 into the off-line service state. Accordingly, at this point, the secondary TPS 110 is operating on the new software version or upgrade OSA 6.0 and contains most recent transaction data, in the OSA 6.0 format, on the secondary database 130.

At step 225, the secondary TPS 110 is placed into on-line service, as a standalone, thereby effectively bringing the operation of the transaction service system 100 into an on-line service state, wherein at least one TPS is servicing incoming transactions. At this point, the secondary TPS 110 is operating in accordance with OSA 6.0 and may access the transaction data (OSA 6.0 format) contained in the associated secondary database 130. Correspondingly, since the secondary TPS 110 is placed into on-line service, the secondary TPS 110 is able to service incoming transactions and accumulate new transaction data. As such, the secondary TPS 110 receives and services incoming transactions during the time period that the primary TPS 105 is maintained in off-line status.

At step 230, the new software installation or upgrade, illustrated as Operating Software Application 6.0 (OSA 6.0), is implemented or installed on the primary TPS 105. Correspondingly, the primary TPS 105 is rebooted on the new software version or upgrade (OSA 6.0), wherein the primary TPS 105 is operating in accordance with OSA 6.0. The original transaction data contained in the primary database 125, which is still in the OSA 5.0 format, becomes outdated the instance that the secondary TPS 110 is placed into on-line service and accumulates new transaction data. As mentioned, in Step 230, since the secondary TPS 110 is placed into on-line service, the secondary TPS 110 is able to service incoming transactions and accumulate new transaction data. Correspondingly, the transaction data in secondary database 130 now contains the most recent transaction data, in the OSA 6.0 format.

At Step 235, the primary TPS 105 remains in an off-line status while operating in accordance with OSA 6.0, however, the primary TPS 105 is still able to receive transaction data from another TPS, such as the secondary TPS 110, but does not receive or service incoming transactions. During the transitory time period that the primary TPS 105 is placed in off-line status and the secondary TPS 110 is placed into on-line service, the primary TPS 105 is no longer receiving incoming transactions and the primary database 125 becomes outdated with respect to the secondary database 130.

Accordingly, at Step 240, an on-line resynchronizing process is initiated, wherein the transaction data in secondary database 130, which includes the most recent transaction data from Step 235, is transferred to the primary TPS 105 via the system network connection infrastructure 115. The on-line resynchronization process enables the transfer of transaction data contained in the second database 130 to the primary TPS 105 (and thereby the primary database 125), without having to remove the secondary TPS 110 from on-line service. The primary TPS 105 then stores the newly transferred transaction data, which is in OSA 6.0 format, into the primary database 125. Accordingly, the transferred transaction data (in OSA 6.0 format) contained in the primary database 125 is accessible by the primary TPS 105 which operates in accordance with OSA 6.0. Correspondingly, the outdated transaction data maintained on the primary database 125 prior to the transfer is either overwritten, disposed of, or otherwise discarded. The primary database 125 associated with the primary TPS 105 now contains the most recent transaction data, in the OSA 6.0 format.

The on-line resynchronization process allows for the transfer of transaction data from the secondary TPS 110 to the primary TPS 105 without having to remove the secondary TPS 110 from on-line service. As such, the secondary TPS 110 is able to continue servicing incoming transactions and accumulate new transaction data during the on-line resynchronization process, which is likewise transferred and shared with the primary TPS 105. At this point, both the primary TPS 105 and secondary TPS 110 are running on the same Operating Software Application 6.0 (OSA 6.0) and have matching transaction data in each of their respective associated TPS databases.

At Step 245, the primary TPS is removed from off-line status and placed into on-line service, wherein the primary TPS is configured to receive and service incoming transactions. At this point either the primary TPS 105 or secondary TPS 110 can be configured to be the "active" transaction center which actually receives the incoming transactions, likewise either the primary TPS 105 or secondary TPS 110 can be configured to be the "backup" transaction center which receives transaction data from the "active" transaction center.

The above illustrated method does not require that any particular TPS be removed from on-line service in any particular order, as the above method may likewise be implemented by removing any TPS (such as the primary TPS 105) from on-line service first. The above described method is applicable to any redundant transaction service system and accordingly does not require a specific order of TPS removal (i.e. secondary TPS before primary TPS) from service before another TPS.

Figure 3:
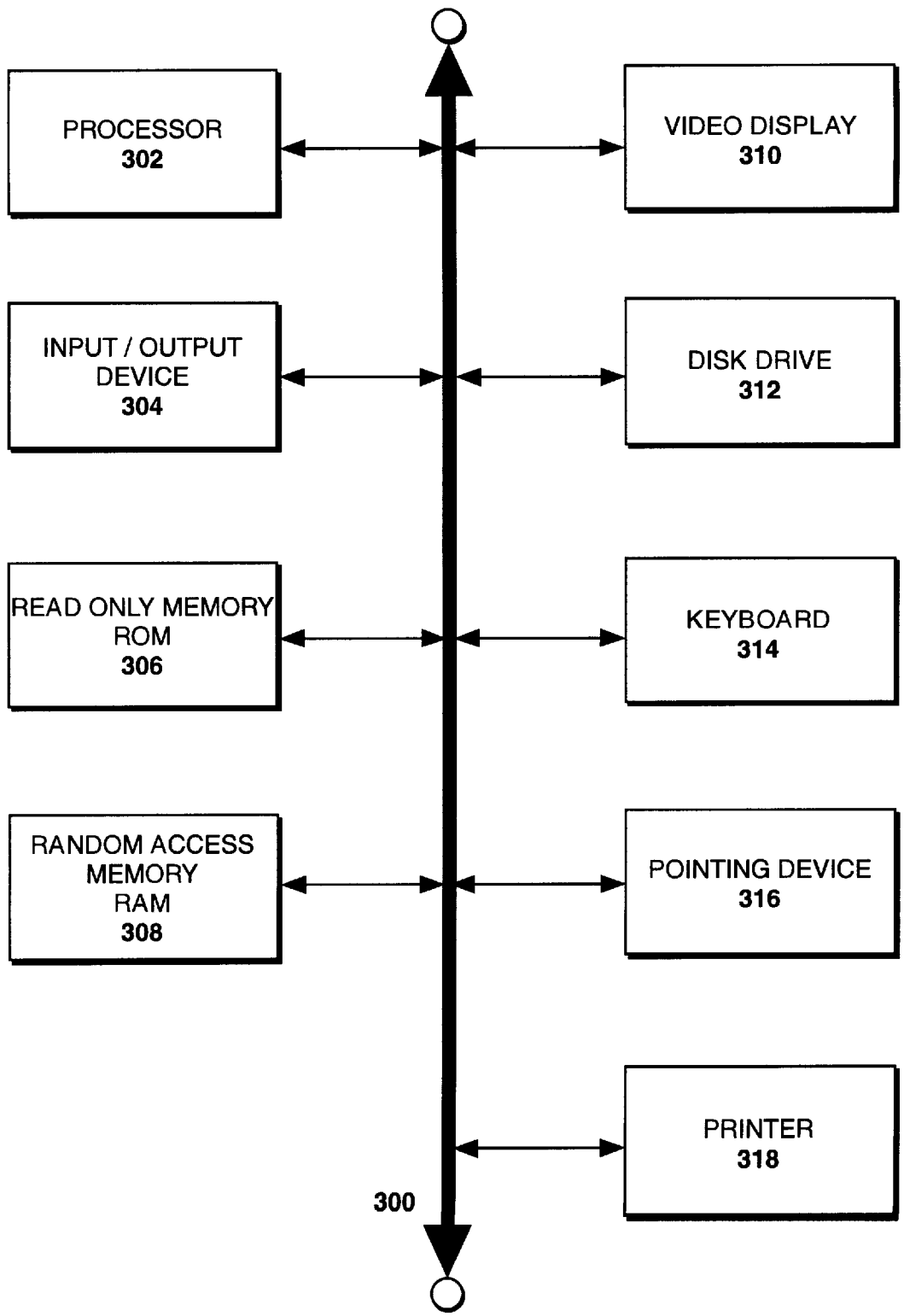
FIG. 3 illustrates an embodiment of a computer system that can be used with the present invention.

FIG. 3 illustrates an embodiment of a computer system that can be used with the present invention (e.g.: redundant transaction service system). The various components shown in FIG. 3 are provided by way of example. Certain components of the computer system in FIG. 3 can be deleted from the processing system for a particular implementation of the invention. The computer shown in FIG. 3 may be any type of computer including a general purpose computer.

FIG. 3 illustrates a system bus 300 to which various components are coupled. A processor 302 performs the processing tasks required by the computer. The processor 302 may be any type of processing device capable of implementing the steps necessary to perform the processing operations described herein. An input/output (I/O) device 304 is coupled to bus 300 and provides a mechanism for communicating with other devices coupled to the computer. A read-only memory (ROM) 306 and a random access memory (RAM) 308 are coupled to bus 300 and provide a storage mechanism for various data and information used by the computer. Although ROM 306 and RAM 308 are shown coupled to bus 300, in alternate embodiments, ROM 306 and RAM 308 are coupled directly to processor 302 or coupled to a dedicated memory bus (not shown).

A video display 310 is coupled to bus 300 and displays various information and data to the user of the computer. A disk drive 312 is coupled to bus 300 and provides for the long-term mass storage of information. Disk drive 312 may be used to store various received data, generated and used by the processing system. A keyboard 314 and pointing device 316 are also coupled to bus 300 and provide mechanisms for entering information and commands to the computer. A printer 318 is coupled to bus 300 and is capable of creating a hard-copy of information generated by or used by the computer.

Figure 4:
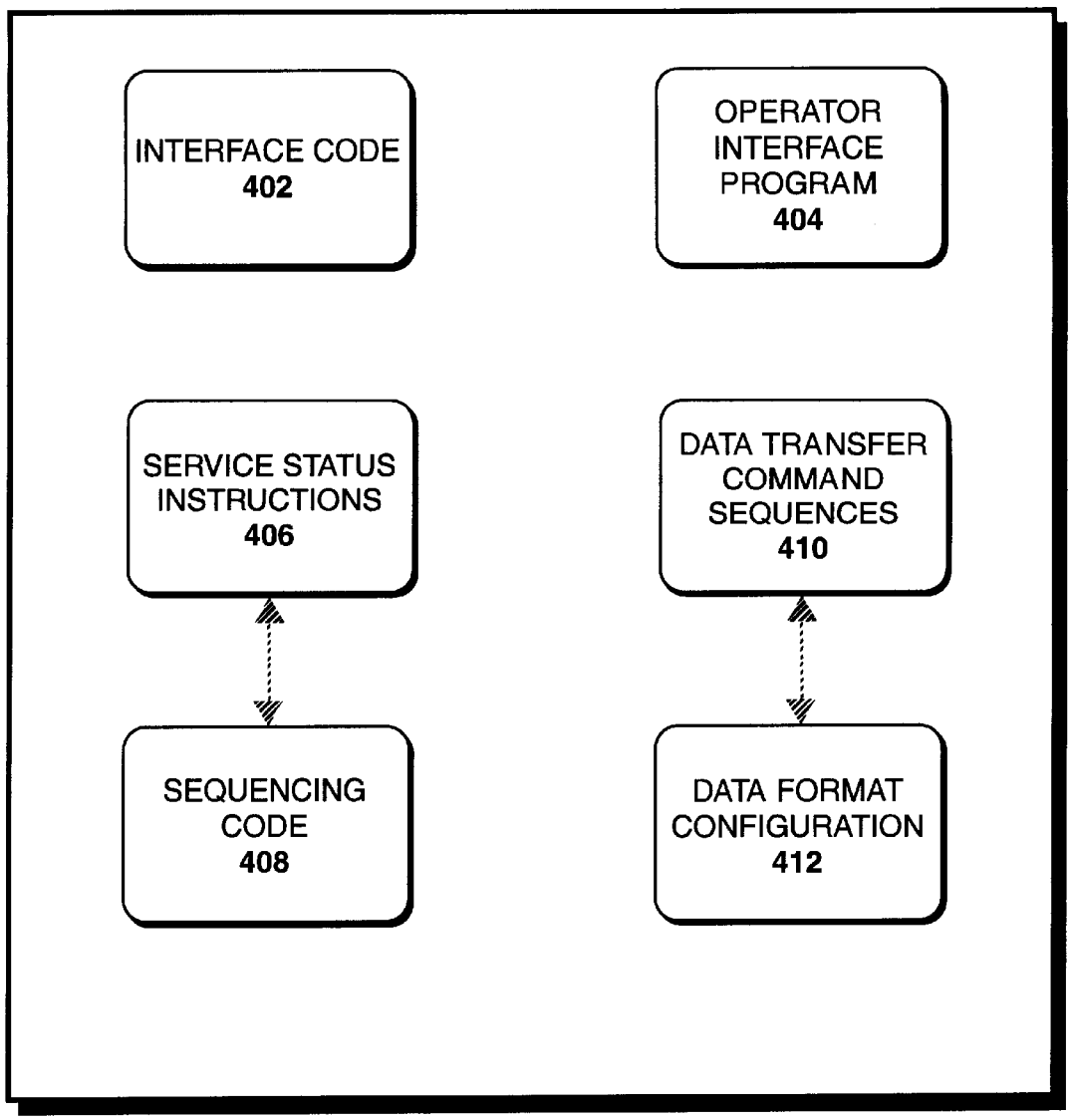
FIG. 4 illustrates an embodiment of a computer-readable medium containing various sets of instructions, code sequences, configuration information, and other data used by a computer or other processing device, which when executed automatically upgrades and synchronizes a redundant transaction service system.

FIG. 4 illustrates an embodiment of a computer-readable medium 400 containing various sets of instructions, code sequences, configuration information, and other data used by a computer or other processing device, which when executed automatically upgrades and synchronizes a redundant transaction service system. The embodiment illustrated in FIG. 4 is suitable for use with the transaction processing system described above. The various information stored on medium 400 is used to perform various transaction processing and related operations. Computer-readable medium 400 is also referred to as a processor-readable medium. Computer-readable medium 400 can be any type of magnetic, optical, or electrical storage medium including a diskette, magnetic tape, CD-ROM, memory device, or other storage medium.

Computer-readable medium 400 includes interface code 402 that controls the flow of information or data between various devices or components in the transaction service system. Interface code 402 may control the transfer of information within a device (e.g., between the processor and a memory device), or between an input/output port and a storage device. Additionally, interface code 402 may control the transfer of information from one device to another (e.g., the transfer of transaction data between TPSs).

Computer-readable medium 400 also includes operator interface program 404 that enables an operator to select and install new software programs or upgrades with respect to the transaction service system. Additionally, the computer medium 400 includes TPS service status instructions or commands 406 that control the on-line and off-line service status associated with the respective associated TPSs during any new software installation and upgrade. Further, the computer medium 400 includes sequencing code 408, used in conjunction with the service status instructions or commands 406, which control TPS service status timing relating to the order in which different TPSs are placed into online service or removed from on-line service (off-line status). Further, computer-readable medium 400 includes data transfer command sequences 410 and transaction data format configuration information 412 used in controlling data transfer and any associated formatting functions associated with the transfer of data.

Initially, an operator or administrator of the transaction service system 100 determines if a new software installation or upgrade is required or desired. Accordingly, if a new software installation or upgrade is selected to be implemented, the operator uses the operator interface program 404 to select the type of service (i.e., new software installation or upgrade) to be executed with respect to the transaction service system 100. In the normal operation of the transaction service system prior to instituting a new software installation or upgrade, the primary TPS 105 is operating in accordance with an operating software application, such as Operating Software Application 5.0 (OSA 5.0). Likewise, the secondary primary TPS 110 is also operating in accordance with the operating software application, such as Operating Software Application 5.0

(OSA 5.0). The primary database 125, which is associated with the primary TPS 105, contains current transaction data corresponding to incoming transactions. The secondary database 130, associated with the secondary TPS 110 likewise contains current transaction data, supplied from the primary database 125 of the primary TPS 105, corresponding to incoming transactions.

Once the new software installation or upgrade is selected, through the operator interface program 404, the operator interface program 404 selects corresponding service status instructions or commands 406 that control the on-line and off-line service status associated with the respective associated TPSs during the new software installation or upgrade. The service status instructions or commands 406 utilize sequencing codes 408 which control TPS service status timing relating to the order in which different TPSs are placed into on-line service or removed from on-line service (off-line status). Additionally, the operator interface program 404 carries out the actual software installation of the selected new software or upgrade.

Accordingly, in response to the service status instructions 406 (using the sequencing codes 408), the secondary TPS 110 is removed from on-line service and is placed into an off-line status. When the secondary TPS 110 is placed into off-line status, the secondary TPS 110 is no longer receiving transaction data from the primary TPS 105. As such, based upon the fact that the secondary TPS 110 is no longer receiving transaction data from the primary TPS 105, the secondary database 130 becomes outdated due to the fact that the primary TPS 105 continues to service incoming transactions and accumulate new transaction data which is stored in the primary database 125. As such, the secondary database 130 becomes outdated with respect to the primary database 125. As indicated the primary TPS 105 continues to receive and service incoming transaction and accumulate new transaction data after the secondary TPS 110 has been placed into off-line status.

The operator interface program 404 proceeds to install the new software or upgrade, such as Operating Software Application 6.0 (OSA 6.0), into the secondary TPS 110. Correspondingly, the secondary TPS 110 is rebooted on the new software version or upgrade (OSA 6.0), and as such the secondary TPS is now operating in accordance with OSA 6.0, while maintaining the outdated secondary database 130 (in OSA 5.0 format). In an alternate embodiment, the secondary database 130 is discarded prior to, or subsequently after, the new software installation or upgrade. Correspondingly, the primary TPS 105 is still maintained in on-line service and continues to receive and service incoming transactions, thereby accumulating new transaction data which is stored in the primary database 125, during the new software installation or upgrade being performed on the secondary TPS 110.

Accordingly, in response to the service status instructions 406 (using the sequencing codes 408), the primary TPS 105 is removed from on-line service and is placed into an off-line status. Accordingly, when the primary TPS 105 is placed into off-line status, the primary TPS 105 is no longer receiving or servicing incoming transactions, and as such ceases to accumulate new transaction data. At this point the redundant transaction service system 100 is in an off-line service state, wherein neither the primary TPS 105 or the secondary TPS 110 are receiving/servicing incoming transactions or accumulating any new transaction data. During this off-line service status, the primary database 125 contains the latest or most recent transaction data prior to placing the transaction service system 100 into the off-line service state status.

Next, the data transfer command sequences 410 and transaction data format configuration information 412 are executed, the data transfer commands sequences 410 and transaction data format configuration information 412 are used in controlling transaction data transfer and any associated formatting functions associated to the transfer of transaction data. Accordingly, in response to the execution of data transfer commands sequences and transaction data format configuration information, an upgrade/synchronization process is initiated wherein a high-speed transaction data transfer and transaction data format conversion are executed simultaneously on the transaction data contained in primary database 125. During the high-speed data transfer, the transaction data contained in primary database 125, which includes the most recent transaction data, is transferred to the secondary TPS 110 via the system network connection infrastructure 115. The high speed transfer operates in accordance with the system network connection infrastructure protocol. Simultaneously, along with the high-speed transfer, the transaction data contained in primary database 125 is converted from the original OSA 5.0 format into a format compatible with the new software or upgrade operating on the secondary TPS 110, which in the present example is OSA 6.0.

The secondary TPS 110 then stores the newly transferred and formatted transaction data, which is in OSA 6.0 format, into the secondary database 130. Accordingly, the transferred transaction data (OSA 6.0 format) contained in the secondary database 130 is accessible by the secondary TPS 110 which operates in accordance with OSA 6.0. Correspondingly, the outdated transaction data maintained on the secondary database 130, prior to transfer and formatting step, is either overwritten, disposed of, or otherwise discarded. The secondary database 130 associated with the secondary TPS 110 now contains the most recent transaction data, in the OSA 6.0 format, prior to placing the transaction service system 100 into the off-line service state. Accordingly, at this point, the secondary TPS 110 is operating on the new software version or upgrade OSA 6.0 and contains most recent transaction data, in the OSA 6.0 format, on the secondary database 130.

Next, in response to the service status instructions 406 (using the sequencing codes 408), the secondary TPS 110 is placed into on-line service, thereby effectively bringing the operation of the transaction service system 100 into an on-line service state, wherein at least one TPS is servicing incoming transactions. At this point, the secondary TPS 110 is operating in accordance with OSA 6.0 and may access the transaction data (OSA 6.0 format) contained in the associated secondary database 130. Correspondingly, since the secondary TPS 110 is placed into on-line service, the secondary TPS 110 is able to service incoming transactions and accumulate new transaction data which is stored in the secondary database 130. As such, the secondary TPS 110 receives and services incoming transactions during the time period that the primary TPS 105 is maintained in off-line status.

The operator interface program 404 then proceeds to install the new software or upgrade, Operating Software Application 6.0 (OSA 6.0), into the primary TPS 105. Correspondingly, the primary TPS 105 is rebooted on the new software version or upgrade (OSA 6.0), wherein the primary TPS 105 is now operating in accordance with OSA 6.0. The original transaction data contained in the primary database 125, which is still in the OSA 5.0 format, becomes outdated the instance that the secondary TPS 110 is placed into on-line service and accumulates new transaction data.

As mentioned, once the secondary TPS 110 is placed into on-line service, the secondary TPS 110 is able to service transactions and accumulate new transaction data which is stored in the secondary database 130. Correspondingly, the data in secondary database 130 now contains the most recent transaction data, in the OSA 6.0 format.

Accordingly, the primary TPS 105 remains in an off-line status while operating in accordance with OSA 6.0, however, the primary TPS 105 is still able to receive transaction data from another TPS, such as the secondary TPS 110, but does not receive or service incoming transactions. During the transitory time period that the primary TPS 105 is placed in off-line status and the secondary TPS 110 is placed into on-line service, the primary TPS 105 is no longer receiving incoming transactions and a such the primary database 125 becomes outdated with respect to the secondary database 130.

Next, the user interface program 404 initiates an on-line resynchronization process, wherein the transaction data contained in secondary database 130, which includes the most recent transaction data, is transferred to the primary TPS 105 via the system network connection infrastructure 115. The on-line resynchronization process enables the transfer of transaction data contained in the secondary database 130 to the primary TPS 105 (and thereby the primary database 125), without having to remove the secondary TPS 110 from on-line service. The primary TPS 105 then stores the newly transferred transaction data, which is in OSA 6.0 format, into the primary database 125. Accordingly, the transferred transaction data (OSA 6.0 format) contained in the primary database 125 is accessible by the primary TPS 105 which operates in accordance with OSA 6.0. Correspondingly, the outdated transaction data maintained on the primary database 125, prior to the transfer, is either overwritten, disposed of, or otherwise discarded. The primary database 125 associated with the primary TPS 105 now contains the most recent transaction data, in the OSA 6.0 format.

The on-line resynchronization process allows for the transfer of transaction data from the secondary TPS 110 to the primary TPS 105 without having to remove the secondary TPS 110 from on-line service. As such, the secondary TPS 110 is able to continue servicing incoming transactions and accumulate new transaction data during the on-line resynchronization process, which is likewise transferred and shared with the primary TPS 105. At this point, both the primary TPS 105 and secondary TPS 110 are running on the same Operating Software Application 6.0 (OSA 6.0) and have matching transaction data in each of their respective associated TPS databases.

Next, the primary TPS 105 is removed from off-line status and placed into on-line service, wherein the primary TPS 105 is configured to receive and service incoming transactions. At this point either the primary TPS 105 or secondary TPS 110 can be configured to be the "active" transaction center which actually receives the incoming transactions, likewise either the primary TPS 105 or secondary TPS 110 can be configured to be the "backup" transaction center which receives transaction data from the "active" transaction center.

From the above description and drawings, it will be understood by those of ordinary skill in the art that the particular embodiments shown and described are for purposes of illustration only and are not intended to limit the scope of the invention. Those of ordinary skill in the art will recognize that the invention may be embodied in other specific forms without departing from its spirit or essential characteristics. References to details of particular embodiments are not intended to limit the scope of the claims.

What is claimed is:

1. A method of updating a redundant transaction service system, the redundant transaction service system including a first transaction service device and a second transaction service device, the method comprising the steps of:

removing the first transaction service device from on-line service;

installing new software on the first transaction service device;

removing the second transaction service device from on-line service;

transferring a current database from the second transaction service device to the first transaction service device;

converting the transferred current database into a format associated with the new software;

returning the first transaction service device into on-line service;

installing new software on the second transaction service device returning the second transaction service device into on-line service; and initiating an on-line resynchronization process, wherein the transaction data contained in the current database is transferred from the first transaction service device to the second transaction service device without removing the first transaction service device from on-line service.

2. The method of claim 1, wherein the first and second transaction service devices are call service devices.

3. The method of claim 1, wherein the second transaction service device continues to accumulate new transaction data during the time period between the removal of the first transaction device from on-line service and the removal of the second transaction device from on-line service.

4. The method of claim 1, wherein the current database associated with the second transaction service device is transferred to the first transaction service device via an internal network.

5. The method of claim 1, wherein the steps of transferring and converting the current database are performed simultaneously, and wherein the current database is provided to the first transaction service device in a format compatible with the new software.

6. The method of claim 1, further including the step of installing the new software in the second transaction service device after returning the first transaction service device into on-line service.

7. The method of claim 6, further including the step of transferring the formatted current database associated with the first transaction service device to the second transaction service device when the first transaction service device is in on-line service.

8. The method of claim 7, further including the step of returning the second transaction service device to on-line service after the transfer of the current formatted database from the first transaction service device to the second transaction service device.

9. The method of claim 8, wherein formatted current database associated with the first call service device includes new transaction data acquired by the first transaction device during the time period between the returning of the first transaction service device into on-line service and the returning of the second transaction service device into on-line service.

10. A method of updating a redundant transaction service system, the redundant transaction service system including a first transaction service device and a second transaction service device, the method comprising the steps of:

removing the first transaction service device from on-line service;

installing new software on the first transaction service device;

removing the second transaction service device from on-line service, the second transaction service device having an associated current database at the time of removal from on-line service;

performing a simultaneous transfer and data format conversion on the current database, wherein the current database is provided to the first transaction service device in a format compatible with the new software;

returning the first transaction service device into on-line services;

installing new software on the second transaction service device returning the second transaction service device into on-line service; and initiating an on-line resynchronization process, wherein the transaction data contained in the current database is transferred from the first transaction service device to the second transaction service device without removing the first transaction service device from on-line service.

11. The method of claim 10, wherein the first and second transaction service devices are call service devices.

12. The method of claim 10, wherein the second transaction service device continues to accumulate new transaction data during the time period between the removal of the first transaction device from on-line service and the removal of the second transaction device from on-line service.

13. The method of claim 10, wherein the current second database associated with the second transaction service device is transferred to the first transaction service device via an internal network.

14. The method of claim 10, further including the step of installing the new software in the second transaction service device after returning the first transaction service device into on-line service.

15. The method of claim 14, further including the step of transferring a formatted current database associated with the first transaction service device to the second transaction service device when the first transaction service device is in on-line service.

16. The method of claim 15, further including the step of returning the second transaction service device to on-line service after the transfer of the current formatted database from the first transaction service device to the second transaction service device.

17. The method of claim 16, wherein formatted current database associated with the first call service device includes new transaction data acquired by the first transaction device during the time period between the returning of the first transaction service device into on-line service and the returning of the second transaction service device into on-line service.

18. A computer software product including a medium readable by a processor, the medium having stored thereon a sequence of instructions relating to a redundant transaction service system which, when executed by the processor, cause the processor to:

remove a first transaction service device from on-line service;

install new software on the first transaction service device;

remove a second transaction service device from on-line service;

transfer a current database from the second transaction service device to the first transaction service device;

convert the transferred current database into a format associated with the new software;

return the first transaction service device into on-line service;

installing new software on the second transaction service device returning the second transaction service device into on-line service; and initiating an on-line resynchronization process, wherein the transaction data contained in the current database is transferred from the first transaction service device to the second transaction service device without removing the first transaction service device from on-line service.

19. The computer software product of claim 18, wherein the first and second transaction service devices are call service devices.

20. The computer software product of claim 18, wherein the second transaction service device continues to accumulate new transaction data during the time period between the removal of the first transaction device from on-line service and the removal of the second transaction device from on-line service.

21. The computer software product of claim 18, wherein the current database associated with the second transaction service device is transferred to the first transaction service device via an internal network.

22. The computer software product of claim 18, wherein the steps of transferring and converting the current database are performed simultaneously, and wherein the current database is provided to the first transaction service device in a format compatible with the new software.

23. The computer software product of claim 18, wherein the new software is installed in the second transaction service device after returning the first transaction service device into on-line service.

24. The computer software product of claim 23, wherein the formatted current database associated with the first transaction service device is transferred to the second transaction service device when the first transaction service device is in on-line service.

25. The computer software product of claim 24, wherein the second service device is returned to on-line service after the transfer of the current formatted database from the first service device to the second service device.

26. The computer software product of claim 25, wherein the formatted current database associated with the first call service device includes new transaction data acquired by the first transaction device during the time period between the returning of the first transaction service device into on-line service and the returning of the second transaction service device into on-line service.

* * * * *